(12) United States Patent
Stewart

(10) Patent No.: US 10,313,718 B2
(45) Date of Patent: Jun. 4, 2019

(54) SYSTEM PHYSICAL LAYER PIPE FOR A DIGITAL TELEVISION SYSTEM

(71) Applicant: INTERDIGITAL CE PATENT HOLDINGS, Paris (FR)

(72) Inventor: John Sidney Stewart, Indianapolis, IN (US)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 14/913,407

(22) PCT Filed: Aug. 14, 2014

(86) PCT No.: PCT/US2014/051082
§ 371 (c)(1),
(2) Date: Feb. 22, 2016

(87) PCT Pub. No.: WO2015/026625
PCT Pub. Date: Feb. 26, 2015

(65) Prior Publication Data
US 2016/0277133 A1    Sep. 22, 2016

Related U.S. Application Data

(60) Provisional application No. 61/868,789, filed on Aug. 22, 2013, provisional application No. 61/869,143, (Continued)

(51) Int. Cl.
*H04N 21/2362* (2011.01)
*H04N 21/61* (2011.01)
(Continued)

(52) U.S. Cl.
CPC ........ *H04N 21/2362* (2013.01); *H04H 20/30* (2013.01); *H04H 20/423* (2013.01);
(Continued)

(58) Field of Classification Search
CPC ......... H04N 21/23605; H04N 21/2362; H04N 21/2365; H04N 21/2368; H04N 21/4341;
(Continued)

(56) References Cited

U.S. PATENT DOCUMENTS 8,522,294 B2    8/2013    Salinger
2009/0094356 A1*    4/2009    Vare ................... H04N 21/2362
709/223

(Continued)

FOREIGN PATENT DOCUMENTS

EP    2555510 A2    4/2011
EP    2541927        1/2013

OTHER PUBLICATIONS

ETSI—European Telecommunications Standards Institute. "Digital Video Broadcasting (DVB); Frame structure channel coding and modulation for a second generation digital terrestrial television broadcasting system (DVB-T2)", doc. # ETSI EN 302 755 V1.3.1 (Apr. 2012).

(Continued)

*Primary Examiner* — Jeremy S Duffield
(74) *Attorney, Agent, or Firm* — Joseph J. Opalach

(57) ABSTRACT

Methods and apparatuses are provided for transmitters and receivers for conveying and retrieving important system information carried in a multi-carrier modulation system for which the data stream is organized in multiple physical layer pipes (PLP). This is particularly important when broadcasters share the same physical channel. In one aspect of the present principles this is accomplished by assigning a PLP as a system PLP. The system PLP will carry information such as the mapping between a broadcaster and its PLPs and special messages like the Emergency Alert System and Amber Alert messages. In another aspect of the present principles, this information is carried in signaling data of the signal, instead of a PLP. In yet another aspect of the present (Continued)

principles, this is accomplished by a signaling parameter, which identifies the broadcaster associated with each PLP.

28 Claims, 6 Drawing Sheets

Related U.S. Application Data filed on Aug. 23, 2013, provisional application No. 61/882,827, filed on Sep. 26, 2013, provisional application No. 61/891,563, filed on Oct. 16, 2013.

(51) Int. Cl.
| | | |
|---|---|---|
| *H04N 21/2365* | (2011.01) | |
| *H04N 21/2368* | (2011.01) | |
| *H04N 21/434* | (2011.01) | |
| *H04N 21/236* | (2011.01) | |
| *H04N 21/643* | (2011.01) | |
| *H04L 1/00* | (2006.01) | |
| *H04L 27/26* | (2006.01) | |
| *H04H 20/30* | (2008.01) | |
| *H04H 20/42* | (2008.01) | |
| *H04H 20/59* | (2008.01) | |
| *H04H 60/25* | (2008.01) | |
| *H04H 60/44* | (2008.01) | |
| *H04H 60/73* | (2008.01) | |
| *H04L 5/00* | (2006.01) | |

(52) U.S. Cl.
CPC ............ *H04H 20/59* (2013.01); *H04H 60/25* (2013.01); *H04H 60/44* (2013.01); *H04H 60/73* (2013.01); *H04L 1/0041* (2013.01); *H04L 5/0048* (2013.01); *H04L 27/2601* (2013.01); *H04N 21/2365* (2013.01); *H04N 21/2368* (2013.01); *H04N 21/23605* (2013.01); *H04N 21/4341* (2013.01); *H04N 21/4345* (2013.01); *H04N 21/4347* (2013.01); *H04N 21/6106* (2013.01); *H04N 21/6112* (2013.01); *H04N 21/643* (2013.01)

(58) Field of Classification Search
CPC ........... H04N 21/4345; H04N 21/4347; H04N 21/6106; H04N 21/6112; H04N 21/643; H04L 1/0041; H04L 27/2601
USPC .................................................. 725/148, 151
See application file for complete search history.

(56) References Cited

U.S. PATENT DOCUMENTS

| | | | |
|---|---|---|---|
| 2009/0187949 A1* | 7/2009 | Vare ...................... | H04L 5/0053 725/54 |
| 2009/0190677 A1 | 7/2009 | Jokela et al. | |
| 2011/0055887 A1 | 3/2011 | Vare et al. | |
| 2012/0051320 A1* | 3/2012 | Vare .................. | H04W 36/0016 370/331 |
| 2013/0219431 A1 | 8/2013 | Hong et al. | |
| 2013/0291027 A1* | 10/2013 | Hwang .............. | H04N 21/6131 725/62 |
| 2013/0291046 A1* | 10/2013 | Ko ....................... | H04N 21/262 725/116 |
| 2016/0165017 A1* | 6/2016 | Kwon ................. | H04L 65/4076 370/476 |

OTHER PUBLICATIONS

ATSC "Digital Television Standard, Part 2—RF/Transmission System Characteristics", Doc.# A/53, Part 2:2011, Dec. 15, 2011.
ATSC ATSC Mobile DTV Standard: A/153 Part 10, Mobile Emergency Alert System (A/153 Par 10:2013); Mar. 11, 2013.
ETSI, Digital Video Broadcasting (DVB); Specification for Service Information (SI) in DVB systems, 300 468 V1.11.1 (Apr. 2010).
International Search Report, dated Apr. 12, 2014.

* cited by examiner

SYSTEM PHYSICAL LAYER PIPE FOR A DIGITAL TELEVISION SYSTEM

CROSS-REFERENCE TO RELATED APPLICATIONS

This application claims the benefit, under 35 U.S.C. § 365 of International Application PCT/US14/051082, filed 14 Aug. 2014, which was published in accordance with PCT Article 21(2) on 26 Feb. 2015 in English, and which claims the benefit of U.S. Provisional Patent Application No. 61/868,789 filed 22 Aug. 2013, which claims the benefit of U.S. Provisional Patent Application No. 61/869,143, filed 23 Aug. 2013, which claims the benefit of U.S. Provisional Patent Application No. 61/882,827, filed 26 Sep. 2013, which claims the benefit of U.S. Provisional Patent Application No. 61/891,563, filed 16 Oct. 2013. The provisional patent applications are expressly incorporated by reference herein in their entirety for all purposes.

TECHNICAL FIELD

The present principles relate to communication systems and in particular to sharing a physical channel in digital television systems.

BACKGROUND

On Mar. 26, 2013, the Advanced Television Systems Committee (ATSC), which proposes terrestrial broadcasting digital television standards in the U.S., announced a call for proposals for the next generation (named ATSC 3.0) physical layer. ATSC 3.0 will provide even more services to the viewer and increased bandwidth efficiency and compression performance. This will require breaking backward compatibility with the currently deployed version, ATSC A/53, which comprises an 8-VSB (8 level, Vestigial Sideband) modulation system. ATSC 3.0 is expected to emerge within the next decade and it intends to support delivery to fixed devices of content with video resolutions up to Ultra High Definition 3840×2160 at 60 frames per second (fps). The intention of the system is to support delivery to portable, handheld and vehicular devices of content with video resolution up to High Definition 1920×1080 at 60 fps. The system is also expected to support lower video resolutions and frame rates.

One of the main issues associated with the current ATSC standard is the vulnerability of the 8-VSB modulation system to multipath propagation and Doppler Effect. These impairments are present in the broadcast transmission environment, particularly in large metropolitan cities, and in the delivery to portable/handheld/vehicular devices (which ATSC intends to support). It is a consensus that multi-carrier modulation systems like, for example, the OFDM (orthogonal frequency division multiplex) modulation, are better choices of modulation to combat these impairments.

OFDM is a method of encoding digital data on multiple carrier frequencies. In OFDM, the sub-carrier frequencies are chosen so that the sub-carriers are orthogonal to each other, meaning that cross-talk between the sub-channels is eliminated and inter-carrier guard bands are not required. This greatly simplifies the design of both the transmitter and the receiver; unlike conventional FDM, a separate filter for each sub-channel is not required. The orthogonality allows for efficient modulator and demodulator implementation using the FFT (Fast Fourier Transform) algorithm on the receiver side, and inverse FFT on the transmitter side. In particular, the size of the FFT identifies the number of carriers in the OFDM modulation system. Frequency selective channels are characterized either by their delay spread or coherence bandwidth. In a single carrier system like 8-VSB, a single fade or interference can cause the whole link to fail, but in multi-carrier systems, like OFDM, only a few of the total sub carriers will be affected. This way, multipath fading can be easily eliminated in OFDM, with simpler equalization techniques than in single carrier systems.

The OFDM modulation is adopted in other digital terrestrial television standards, e.g., the DVB-T/DVB-T2 standards in Europe, and the ISDB-T standard in Japan. DVB-T, the $1^{st}$ generation of European DTT (Digital Terrestrial Television), is the most widely adopted and deployed standard. Since its publication in 1997, over 70 countries have deployed DVB-T services and 45 more have adopted (but not yet deployed) DVB-T. This well-established standard benefits from massive economies of scale and very low receiver prices. Like its predecessor, DVB-T2 uses OFDM (orthogonal frequency division multiplex) modulation with a large number of sub-carriers delivering a robust signal, and offers a range of different modes, making it a very flexible standard. DVB-T2 uses the same error correction coding as used in DVB-S2 and DVB-C2: LDPC (Low Density Parity Check) coding combined with BCH (Bose-Chaudhuri-Hocquengham) coding, offering a very robust signal. The number of carriers, guard interval sizes and pilot signals can be adjusted, so that the overheads can be optimized for any target transmission channel. DVB-T2 offers more robustness, flexibility and at least 50% more efficiency than any other DTT system. It supports SD, HD, UHD, mobile TV, or any combination thereof.

Within the DVB family there is a standard specifically for metadata, or Service Information (SI), also called DVB-SI. The standard allows for SI to accompany broadcast signals and is intended to assist the receiver/decoder and viewers to navigate through the growing array of digital services on offer. Within DVB-SI, the Event Information Table (EIT) is specifically important as a means of communicating program ("event") information. The EIT can be used to give information such as the program title, start time, duration, a description and parental rating. It is also possible to classify programs using what are known as "content descriptors", identifying the content from a set of categories and subcategories.

The current DVB-T2 system contains a feature called Physical Layer Pipes (PLP), which represent different services or virtual channels within the data stream of one physical channel (or spectral band). A DVB-T2 signal may contain multiple PLPs. This feature allows for differing types of data to be sent with differing data rates and amounts of error correction. Further up the communication stack, there is information in the DVB-SI information that maps the PLPs to their content. For example, the DVB-SI may describe which PLP contains a program video and which other PLP contains a program audio.

When a new broadcast system is deployed, as it will eventually be the case for ATSC 3.0, one issue to consider is whether distinct broadcasters are sharing physical channels. For many years, television broadcasting has been characterized by having one broadcaster transmitting one TV program over one physical channel. With the introduction and transition to ATSC broadcasting, this mindset has started to change. The availability of multiple programs on a single channel as well as the introduction of integrated program guides has enhanced the importance of the broadcaster while loosening the link between the broadcaster and the physical channel. This trend should continue and be enhanced with the introduction of ATSC 3.0. The end consumer does not care over which physical channel a service is delivered.

Another issue to consider is the requirement for broadcast systems to carry information related to the Emergency Alert System (EAS). The EAS is an American national public warning system that requires broadcasters, cable television systems, wireless cable systems, satellite digital audio radio service (SDARS) providers, and direct broadcast satellite (DBS) providers to provide the communications capability to the President to address the American public during a national emergency. The system may also be used by state and local authorities to deliver important emergency information, such as AMBER alerts (child abduction emergency) and weather information targeted to specific areas (e.g., tornadoes, blizzards, floods, etc.). Other countries may adopt similar systems.

For the DVB-T2 standard, a problem may occur if more than one broadcaster is sharing a physical channel. Each broadcaster may have its own set of DVB-SI information. Currently, there is no method defined in the DVB-T2 standard to describe which PLPs/services belong to which broadcaster and where to find each broadcaster's DVB-SI or equivalent information (e.g., PSIP). A single PSIP table could still be used to describe all of the programs from different stations/broadcasters, however, this would require them to cooperate at a higher level (e.g., one of them would have to send their programming info ahead of time to the other to make a single PSIP table), which is not ideal.

The present principles attempts to encourage and facilitate cooperation among broadcasters by proposing ways to convey important system information such as the mapping between a broadcaster and its PLPs/services carried in a multi-carrier modulation system for which the data stream is organized in multiple physical layer pipes (PLP). In addition, special messages like the EAS and Amber Alert messages may also be conveyed by the same mechanism.

BRIEF SUMMARY

The present principles provide methods and apparatuses for transmitters and receivers, for conveying and retrieving important system information carried in a multi-carrier modulation system for which the data stream is organized in multiple physical layer pipes (PLP). This is particularly important when broadcasters share the same physical channel. In one aspect of the present principles this is accomplished by assigning a PLP as a system PLP. The system PLP will carry information such as the mapping between a broadcaster and its PLPs and special messages like the EAS and Amber Alert messages. In another aspect of the present principles, this information is carried in signaling data of the signal. In yet another aspect of the present principles, this is accomplished by a signaling parameter, which identifies the broadcaster associated with each PLP.

According to one aspect of the present principles, an apparatus for transmitting a multi-carrier modulated signal on a physical channel is provided, including: a source for providing data, the data including a broadcaster table identifying a plurality of broadcasters which are sharing the physical channel and a plurality of physical layer pipes (PLP) belonging to the plurality of broadcasters, wherein each physical layer pipe represents a virtual channel or service; and a multi-carrier modulator for modulating the data by allocating the data to a plurality of carriers of the physical channel in a plurality of modulation symbols. The broadcaster table may include each broadcaster id and a corresponding PLP id, the PLP containing system information for each broadcaster. The broadcaster table may further include a number of PLPs for each broadcaster and each PLP id for each broadcaster. The broadcaster table may include a broadcaster id for each PLP in the physical channel. The broadcaster table may be placed in a separate PLP, called system PLP. The System PLP may further include special messages and a special message indicator. The data may further include signaling data and the broadcaster table is placed in the signaling data. The apparatus may further include a channel encoder for at least channel encoding the data prior to the multi-carrier modulator. The multi-carrier modulation may be OFDM.

According to one aspect of the present principles, an apparatus for receiving a multi-carrier modulated signal on a physical channel is provided, including: a multi-carrier demodulator for demodulating the signal to create demodulated symbols; and a data detector for retrieving a broadcaster table from the demodulated symbols, the broadcaster table identifying a plurality of broadcasters which are sharing the physical channel and for retrieving data associated with at least one service of at least one broadcaster. The data may include a plurality of physical layer pipes (PLP), each PLP representing a service and wherein the broadcaster table includes each broadcaster id and a corresponding PLP id, the PLP containing system information for each broadcaster. The broadcaster table may further include a number of PLPs for each broadcaster and each PLP id for each broadcaster. The data may include a plurality of physical layer pipes (PLP), each PLP representing a service and the broadcaster table includes a broadcaster id for each PLP in the physical channel. The data may include a plurality of physical layer pipes (PLP), each PLP representing a service and the data detector retrieves the broadcaster table from a separate PLP, called system PLP. The data detector may further retrieve a special message indicator and special message from the System PLP. The data may further include signaling data and the data detector retrieves the broadcaster table from the signaling data. The apparatus may further include a channel decoder for at least channel decoding the output of the multi-carrier demodulator prior to recovering the broadcaster table. The multi-carrier modulation may be OFDM.

According to one aspect of the present principles, a method for transmitting a multi-carrier modulated signal on a physical channel is provided, including: providing data, the data including a broadcaster table identifying a plurality of broadcasters which are sharing the physical channel and a plurality of physical layer pipes (PLP) belonging to the plurality of broadcasters, wherein each physical layer pipe represents a virtual channel or service; and multi-carrier modulating the data by allocating the data to a plurality of carriers of the physical channel in a plurality of modulation symbols. The broadcaster table may include each broadcaster id and a corresponding PLP id, the PLP containing system information for each broadcaster. The broadcaster table may further include a number of PLPs for each broadcaster and each PLP id for each broadcaster. The broadcaster table may include a broadcaster id for each PLP in the physical channel. The broadcaster table may be placed in a separate PLP, called system PLP. The System PLP may further include special messages and a special message indicator. The data may further include signaling data and the broadcaster table is placed in the signaling data. The method may further include channel encoding the data prior to the multi-carrier modulator. The multi-carrier modulation may be OFDM.

According to one aspect of the present principles, a method for receiving a multi-carrier modulated signal on a physical channel is provided, including: multi-carrier demodulating the signal to create demodulated symbols; retrieving a broadcaster table from the demodulated symbols, the broadcaster table identifying a plurality of broadcasters which are sharing the physical channel and for retrieving data associated with at least one service of at least one broadcaster. The data may include a plurality of physical layer pipes (PLP), each PLP representing a service and the broadcaster table includes each broadcaster id and a corresponding PLP containing system information for each broadcaster. The broadcaster table may further include a number of PLPs for each broadcaster and each PLP id for each broadcaster. The data may include a plurality of physical layer pipes (PLP), each PLP representing a service and the broadcaster table includes a broadcaster id for each PLP in the physical channel. The data may include a plurality of physical layer pipes (PLP), each PLP representing a service and the broadcaster table is retrieved from a separate PLP, called system PLP. The System PLP may further include special messages and a special message indicator. The data may further include signaling data and the broadcaster table is retrieved from the signaling data. The method may further include a channel decoder for at least channel decoding the output of the multi-carrier demodulator prior to recovering the broadcaster table. The multi-carrier modulation may be OFDM.

Additional features and advantages of the present principles will be made apparent from the following detailed description of illustrative embodiments which proceeds with reference to the accompanying figures.

BRIEF DESCRIPTION OF THE DRAWINGS

The present principles may be better understood in accordance with the following exemplary figures briefly described below.

DETAILED DISCUSSION OF THE EMBODIMENTS

The present principles relate to communication systems and in particular, to a system physical layer pipe in digital television systems. Other than the inventive concept, several elements hereby discussed are well known and will not be described in detail. For example, other than the inventive concept, familiarity with the second generation digital terrestrial television broadcasting system for Digital Video Broadcasting (DVB-T2) is assumed and not described herein. In this regard, familiarity with the standards and recommended practices of ETSI EN 302 755 and ETSI TS 102 832 is assumed and not described herein. In addition, familiarity with the DVB standard for metadata, or Service Information (SI) is assumed and not described herein. In this regard, familiarity with the ETSI EN 300 468 specification is assumed. Also, familiarity with the digital terrestrial television broadcasting system for the US (ATSC) is assumed and not described herein. In this regard, familiarity with the standards and recommended practices of ATSC A/53, A/153 and A/54 is assumed and not described herein. Furthermore, familiarity with the US Emergency Alert System is assumed and not described herein. In this regard, familiarity with the EAS Rules (47 C.F.R. Part 11) is assumed and not described herein. It should also be noted that the inventive concept may be implemented using conventional programming techniques, which, as such, will not be described herein.

Figure 1:
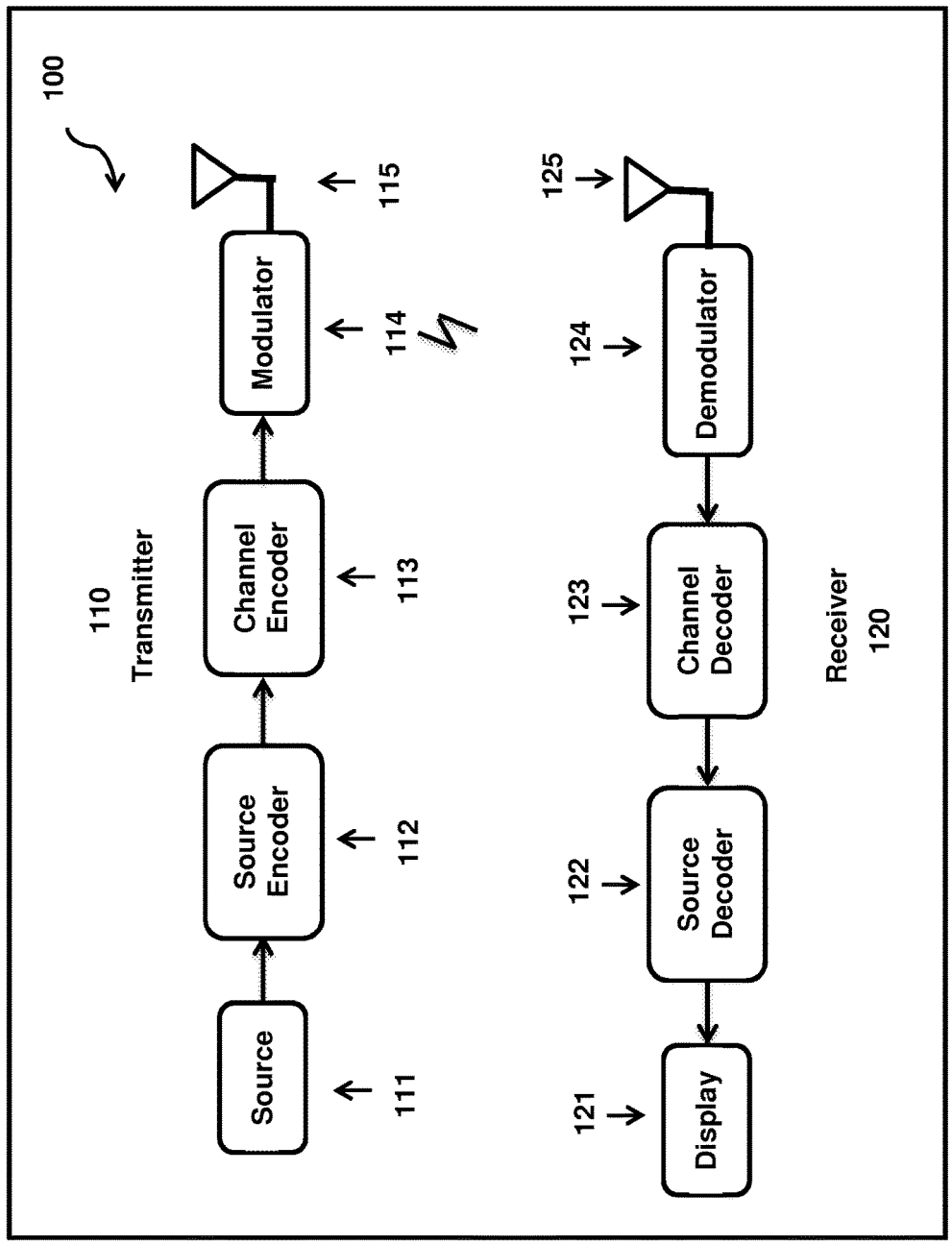
FIG. 1 illustrates a simplified block diagram of a general digital communication system applicable to the digital broadcasting channel.

FIG. 1 shows a simplified block diagram 100 of a general digital communication system applicable to the digital broadcasting channel, independent of the modulation system and system architecture. The transmitter device 110 includes the following components:

a source 111 for the audio, video, signaling or control and other ancillary data (e.g., program guide);

a source encoder 112, including audio and video encoders to compress the audio and video data;

a channel encoder 113 including at least some of the functions of randomizing, interleaving, channel coding and frame mapping to process the compressed, signaling and ancillary digital data for robustness and to add levels of error correcting encoding functionality;

a modulator 114 to convert the processed digital data into modulation symbols, which can be, for example, VSB (ATSC) or OFDM (DVB-T2). In addition, it includes the functionality of filtering and digital-to-analog (D/A) conversion; and an antenna 115 representing the functionalities of up-conversion, RF amplification and over-the-air broadcasting.

At the receiver device 120 of FIG. 1, the inverse functions of the transmitter are performed, including the following components:

an antenna for reception 125, which includes the functionalities of over-the-air reception, RF down-conversion and tuning;

a demodulator 124 to recover the digital data from the modulation symbols and includes the functionalities of analog-to-digital conversion (D/A), gain control, carrier and symbol timing recovery, equalization and header or preamble sync detection;

a channel decoder 123 to recover the compressed and ancillary data by performing the inverse functionalities of the channel encoder, including error correcting decoding, de-interleaving and de-randomizing;

a source decoder 122 to decompress the audio and video data, including video and audio decoders; and a display device 121 for audio/video viewing.

A skilled artisan will appreciate that a source encoder 112 and a channel encoder 113, although common in general communications systems, are not essential for a system according to the present principles. Similarly, depending on the transmitter, a source decoder 122 and a channel decoder 123, although common in general communications systems, are not essential for a system according to the present principles. In addition, the transmitter and receiver may not require an antenna, if the transmission system is other than over-the-air (e.g., over cable). Furthermore, a receiving device includes, but is not limited to: a television, a set-top box, a computer, a mobile phone, an automobile receiver and a tablet.

A generic DVB-T2 system source 111 and source encoder 112 may provide one or more MPEG-2 Transport Stream(s) and/or one or more Generic Stream(s). An Input Pre-Processor may include a Service splitter or de-multiplexer for Transport Streams (TS) for separating the services into the system inputs, which are one or more logical data streams. These are then carried in individual Physical Layer Pipes (PLPs). This feature allows for differing types of data to be sent with differing data rates and amounts of error correction. Further up the communication stack, there is information in the DVB-SI information that maps the PLPs to their content. For example, the DVB-SI may describe which PLP contains a program video and which other PLP contains a program audio.

Figure 2:
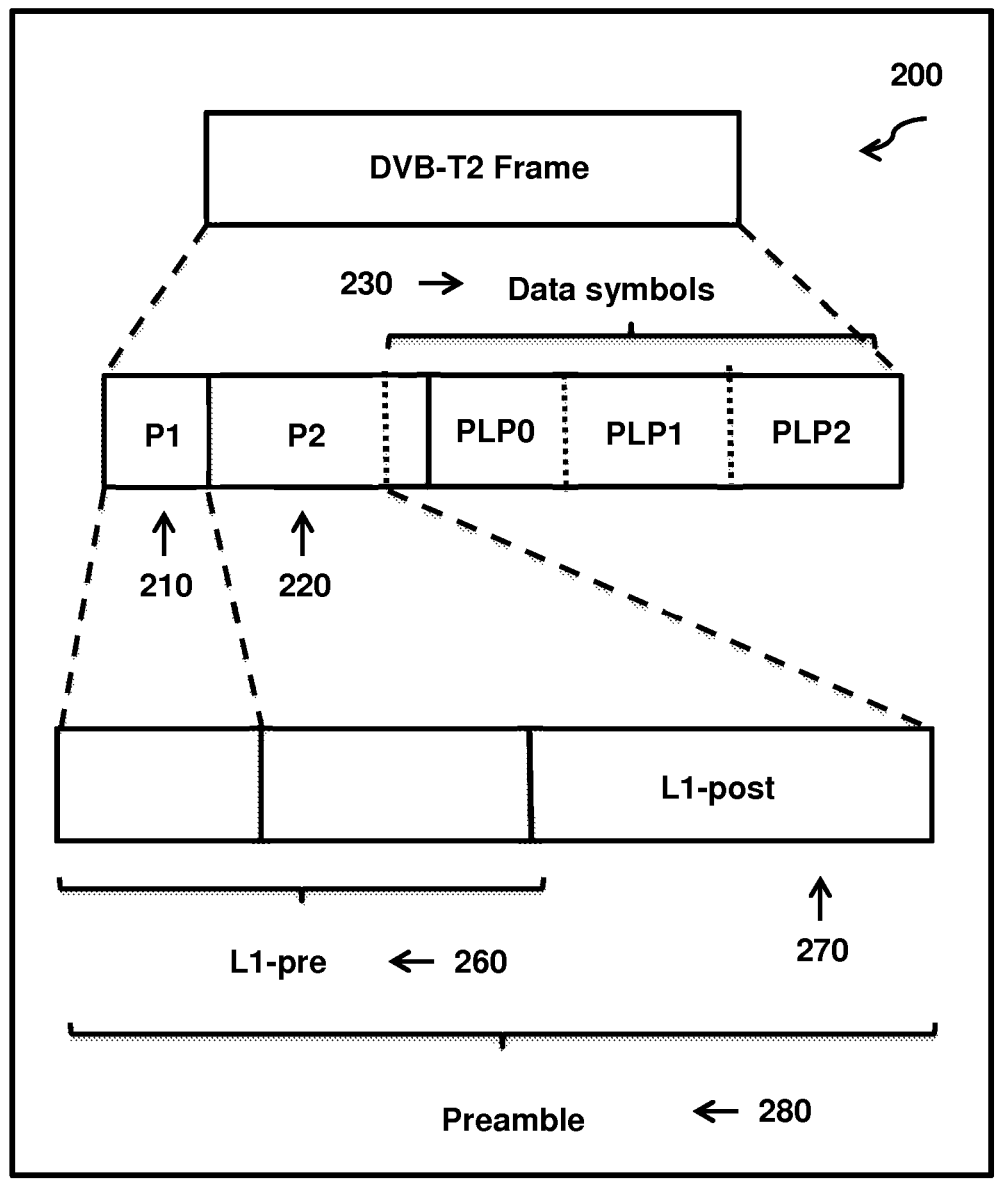
FIG. 2 illustrates an exemplary frame structure of a DVB-T2 digital television system.

FIG. 2 shows the frame structure of a DVB-T2 system. The DVB-T2 frame 200 is composed of a preamble 280, followed by the data symbols 230.

The data symbols 230 may contain one or more PLPs, representing different services: PLP0, PLP1, PLP2, etc. The preamble includes a P1 symbol 210 and a plurality of P2 symbols 220, depending on the amount of signaling information in the system. The signaling information is contained in two main blocks of data: L1-pre signaling 260 and L1-post signaling 270, each consisting of a plurality of signaling parameters which define the system, including modulation parameters, FEC parameters, frame size, etc. Since the preamble (comprising both P1 and P2 symbols) may have different formats, the main use of the P1 signaling is to identify the preamble itself. Besides being the first symbol of a DVB-T2 frame, the P1 symbol is a special symbol which has its own fixed FFT size to facilitate initial demodulation and detection.

When a new broadcast system is deployed, as it will eventually be the case for ATSC 3.0, one issue to consider is whether distinct broadcasters are sharing physical channels. For many years, television broadcasting has been characterized by having one broadcaster transmitting one TV program over one physical channel. With the introduction and transition to ATSC broadcasting, this mindset has started to change.

With ATSC 3.0, there may be several scenarios where more than one broadcaster may want to use a single physical channel. Due to the small size of mobile and handheld devices, the antenna sizes that are possible in these devices are limited. This makes the use of UHF frequencies for mobile service a better fit due to the direct relationship between antenna efficiency, frequency, and antenna size. In a market that has stations operating at both UHF and VHF frequencies, a possible scenario is for them to share the use of the physical frequencies. Instead of each broadcaster using 100% of their own spectrum, two broadcasters could cooperate to each use 50% of the others channel capacity. This way, the UHF channel could be dedicated and optimized for mobile use, while the VHF channel would be optimized for fixed reception use.

Another scenario is related to many current broadcast markets in the U.S. having stations that occupy adjacent channels with many having co-located transmitters. By combining their two physical channels into a single 12 MHz channel, there can be a substantial increase in bit rate efficiency. By implementing statistical multiplexing across the two services, approximately 10% additional stat mux gain could be achieved. There is also a small gain of approximately 2% in bit rate capacity from the removal of the unused gap between the channels. It is expected that, in the deployment timeframe for ATSC-3.0, the additional receiver cost for receiving both a 6 MHz and 12 MHz channel would be minimal. The primary cost would be on the transmitter side where the filtering and power requirements would need to be modified. However, the use of a 12 MHz channel would be optional on the transmitter side so that it would only be used in cases where the bit rate gains exceed the implementation cost.

Also, in many broadcast markets, the various broadcast towers are not all co-located. This provides a problem for many consumers who wish to receive a large portion of the available channels. If they turn their antenna towards one subset of stations, they can no longer receive another subset of stations. One possibility is for the broadcasters to cooperate and each retransmit some subset of the other's signal. This re-transmitted signal may be restricted to a lower resolution version of their main signal, but the consumer would be able to receive a larger subset of the channels without having to re-orient their antenna. This strategy also applies particularly well to mobile services where the varying multipath caused by the movement of the receiver can cause loss of one signal but not another on a different frequency. By adding frequency diversity in this simple way, the quality of the user experience can be substantially enhanced.

The availability of multiple programs on a single channel as well as the introduction of integrated program guides has enhanced the importance of the broadcaster while loosening the link between the broadcaster and the physical channel. This trend should continue and be enhanced with the introduction of ATSC-3.0. The end consumer does not care over which physical channel a service is delivered.

Another issue to consider is the requirement for broadcast systems to carry information related to the Emergency Alert System (EAS). The EAS is an American national public warning system that requires broadcasters, cable television systems, wireless cable systems, satellite digital audio radio service (SDARS) providers, and direct broadcast satellite (DBS) providers to provide the communications capability for the President to address the American public during a national emergency. The system may also be used by state and local authorities to deliver important emergency information, such as AMBER alerts (child abduction emergency) and weather information targeted to specific areas (e.g., tornadoes, blizzards, floods, etc.). Other countries may adopt similar systems.

For current transmission systems like the one described in the DVB-T2 standard, a problem may occur if more than one broadcaster is sharing a physical channel. Each broadcaster may have its own set of DVB-SI information. Currently, there is no method defined in the DVB-T2 standard to describe which PLPs belong to which broadcaster and where to find each broadcaster's DVB-SI or equivalent information (e.g., PSIP). A single PSIP table could still be used to describe all of the programs from different stations/broadcasters, however, this would require them to cooperate at a higher level (e.g., one of them would have to send their programming info ahead of time to the other to make a single PSIP table), which is not ideal.

According to one aspect of the present principles, methods and apparatuses are proposed for a transmitter and a receiver of a multi-carrier modulated signal. The transmitter transmits a signal comprising a plurality of physical layer pipes (PLP) on a physical channel and sets one of the PLPs, called System PLP, to convey important system information, such as the mapping between a broadcaster and its corresponding PLPs. Since there is a System PLP identifying each broadcaster and pointing to the PLP that contains the broadcaster's PSIP information, then each station in essence can remain separate, since there is no need to cooperate on a higher level to create a joint PSIP information.

Figure 3:
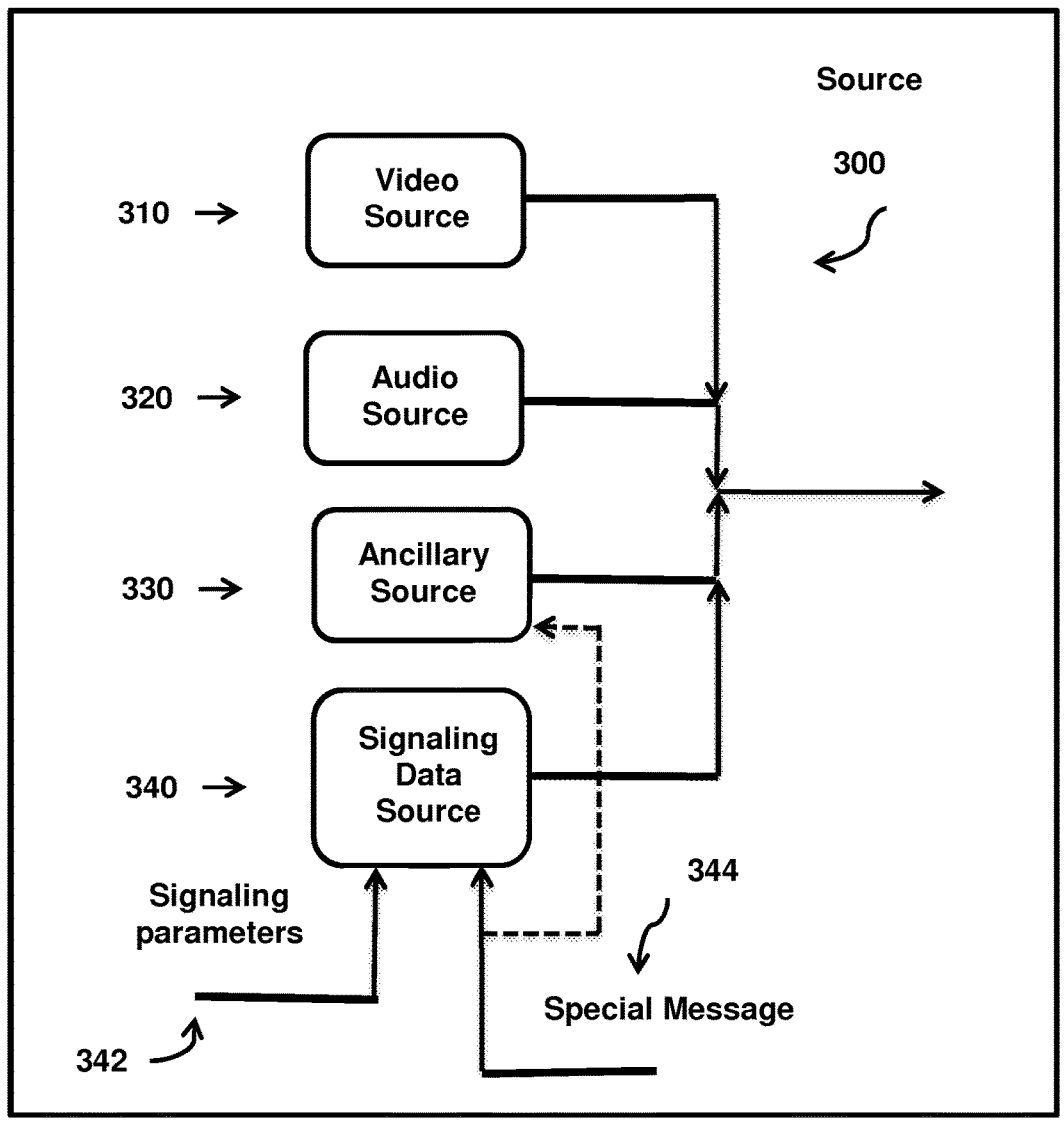
FIG. 3 illustrates an exemplary transmitter source according to the present principles.

FIG. 3 shows additional details of the source 111 of FIG. 1, including the video source 310, audio source 320, other ancillary data source 330 and a signaling data source or generator 340. The various sources may not be co-located and may be provided via various forms of data links (e.g., satellite, cable, microwave). The signaling data source is a function of the communication system and may have a number of fixed parameters as well as variable parameters which can be provided via a user interface or another type of input (e.g., a file, a remote data link). According to the present principles, the signaling data source includes a plurality of signaling parameters 342. Depending on the system, the signaling parameters may or not be channel encoded (in channel encoder 113). For example, in ATSC, signaling data like the field and segment sync are not channel encoded; in DVB-T2 all signaling parameters are channel encoded in the L1 pre and post signaling. The special messages 344 like EAS messages are also provided via a user interface or another type of input and incorporated into the signaling or other ancillary data.

The modulator 114 according to the present principles creates a multi-carrier modulated signal, consisting of a sequence of modulation symbols, by allocating data to a plurality of carriers per modulation symbol, for signaling data and non-signaling data (video, audio, other ancillary data). The plurality of carriers spread over the bandwidth of the physical channel.

At the receiver, demodulation 124 is first performed to acquire the signaling data at a signaling data detector and set the receiver parameters accordingly. If the signaling data was channel encoded at the transmitter (at channel encoder 113), the signaling data detector must reside inside or after the channel decoder 123; otherwise, it can reside inside or after the demodulator 124. After the signaling data is recovered, the receiver extracts the various parameters contained in the signaling data to set its various modes of operation associated with its various data related blocks (including but not limited to modulation, e.g., constellation size, FFT size; FEC; interleaving; data distribution within the frame, including the various PLP sizes and other parameters; etc.). The parameters are then sent to the various blocks in order for demodulation and decoding to be performed on the video, audio and other ancillary data.

Figure 4:
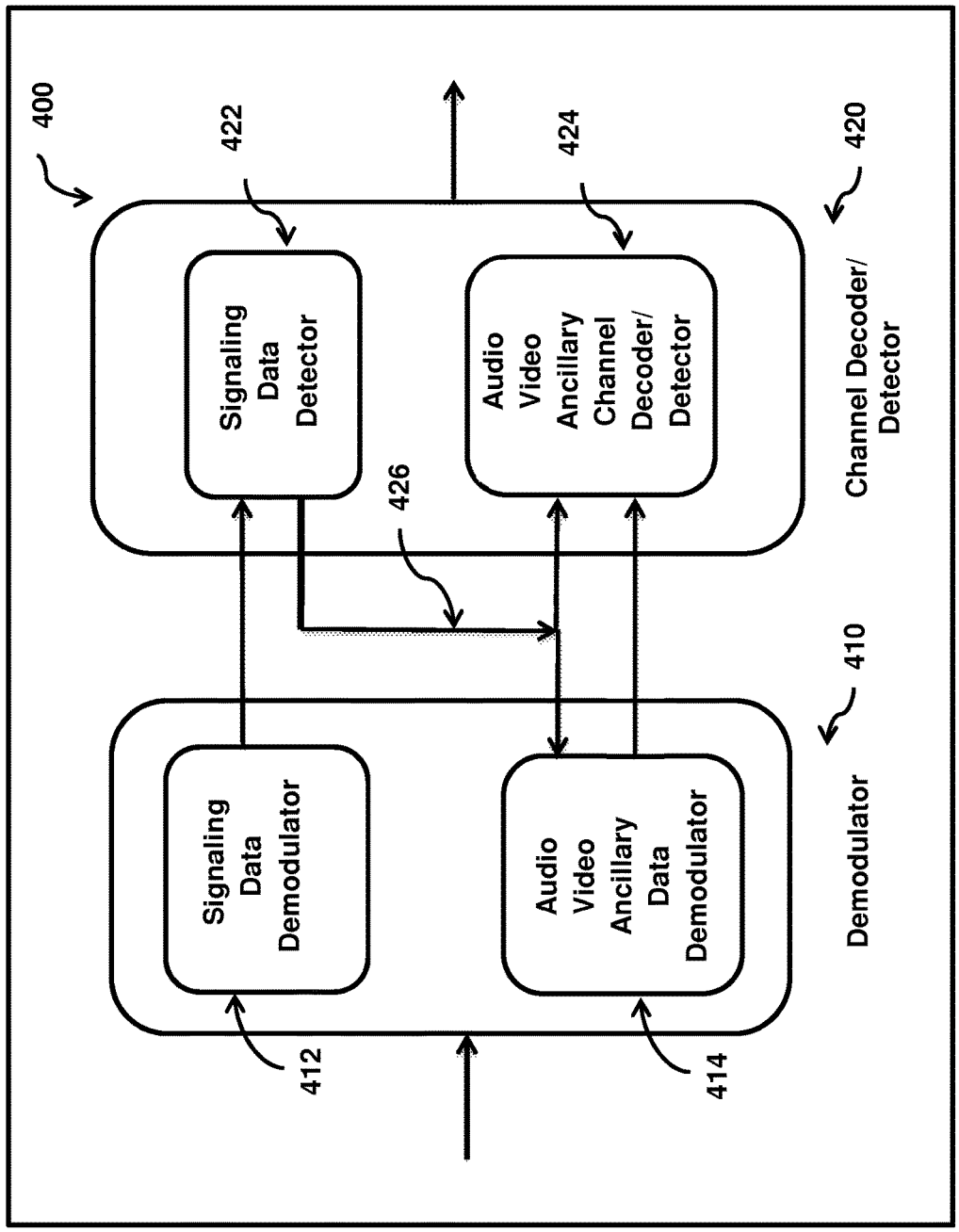
FIG. 4 illustrates an exemplary demodulator and channel decoder according to the present principles.

FIG. 4 shows an exemplary block diagram according to the present principles depicting a multi-carrier demodulator 410 and channel decoder 420. The demodulator 410, for all practical purposes, can be shown as composed of two blocks: the signaling data demodulator 412, which demodulates the signaling data symbols and sends the demodulated signaling data symbols to the signaling data detector 422. At the signaling data detector 422, the signaling data 326 is recovered from several potential levels of interleaving, randomizing and channel encoding for protection of the data against channel impairments. Once the signaling data 426 is recovered, it is then sent to other blocks of the receiver, including the audio/video/ancillary (non-signaling) data demodulator 414 and the audio/video/ancillary data channel decoder 324. These two blocks will demodulate and decode the audio, video and other ancillary (data other than signaling) data symbols as a function of the several signaling data parameters 426. Within the channel decoder, a detector will retrieve the decoded data. If no channel encoder is present in the system, block 324 is just a data retrieval block or detector.

After acquisition of the signaling data, the receiver demodulates and decodes the plurality of PLPs, of which the System PLP contains the desired system related data. For example, when the user tunes the receiver to channel ABC123, the receiver tunes to the physical channel associated with this station/broadcaster. It then looks in the System PLP for ABC123, which tells the receiver to look on PLP5 for the PSIP table for ABC123. The PSIP table indicates which PLPs belong to station ABC123. Other PLPs belonging to another broadcaster utilizing the same physical channel will not be accessed when the user chooses ABC123. The user does not know anything about other broadcasters using this same station and sharing the same physical channel.

The System PLP may be the first PLP of the data stream and it shall be generally sent with the highest level of FEC encoding to insure reception.

One of the pieces of information that the System PLP may contain is the mapping for each broadcaster sharing the physical channel, their respective PLPs, and where each broadcaster's DVB-SI (or equivalent) information is to be found.

Another piece of information that can be conveyed is the Emergency Alert System (EAS) messages. The EAS is an American national public warning system that requires broadcasters, cable television systems, wireless cable systems, satellite digital audio radio service (SDARS) providers, and direct broadcast satellite (DBS) providers to provide the communications capability for the President to address the American public during a national emergency. The system may also be used by state and local authorities to deliver important emergency information, such as AMBER alerts and weather information targeted to specific areas. Other countries may adopt similar systems.

The System PLP may also carry a version number that is changed when the information it conveys has changed. This would be particularly important for the EAS messaging so that the receiver knows when there is a new EAS message that it needs to receive. If the version is the same as the last version that it checked, it can just go back to sleep.

The components of a System PLP include a broadcaster table, which identifies the broadcasters associated with a particular physical channel. The broadcaster table includes at least each broadcaster id associated with the physical channel and the PLP id containing system information for each broadcaster (e.g. DVB-SI or equivalent information). The broadcaster table may additionally include the number of broadcasters, the number of PLPs for each broadcaster and each PLP id for each broadcaster. In addition, special messages (e.g., EAS messages) can be included in the System PLP with a corresponding indicator of whether a special message is available.

Table 1 shows an exemplary format for a System PLP according to the present principles. The components of Table 1 are explained below:
 1. version_number: This 8 bit field is the version number of the table.
 2. table_length: This is a 32 bit field that specifies the length in bytes of the section, starting immediately following the table_length field and including the CRC.
 3. EAT_message_available: This is a 1 bit field that indicates whether an EAS message is available. If this field is equal to 1 then it is followed by an EAT_MH_section giving the EAS message information. If it is 0, then no EAT_MH_section follows this bit.

4. EAS_MH_section: EAS message information, described in section 4 of the ATSC A/153 Part 10.
5. num_of_broadcasters: This is an 8 bit field that defines the number of broadcasters that are using this physical channel.
6. broadcaster_id: This is a 32 bit field that identifies this broadcaster as a unique entity that is associated with a set of PLPs.
7. system_info_PLP: This is an 8 bit field that defines which PLP contains the system information for this particular broadcaster.

TABLE 1

| PARAMETERS | NUMBER OF BITS |
|---|---|
| version_number | 8 |
| table_length | 32 |
| EAS_message_available | 1 |
| if(EAS_message_available == 1) | |
| { | |
|     EAT_MH_section( ); | |
| } | |
| num_of_broadcasters | 8 |
| For i=0...num_of_broadcasters | |
| { | |
|     broadcaster_id | 32 |
|     num_of_PLP | 8 |
|     system_info_PLP | 8 |
|     For j=0...num_of_PLP | |
|     { | |
|         PLP_id | 8 |
|     } | |
| } | |
| CRC_32 | 32 |

8. num_of_PLP: This is an 8 bit field that associates a series of PLPs with a specific broadcaster.
9. PLP_id: This is an 8 bit field which identifies a PLP that is associated with this broadcaster. This PLP does not need to be unique to this broadcaster but may also be a part of another broadcasters PLP list.
10. CRC_32: This 32-bit error detection code is applied to the entire content of the System PLP.

In one embodiment of the present principles, the new multi-carrier modulated signal is a DVB-T2 type of signal, that is, a signal that has a frame/super-frame/PLP architecture, modulation, FEC and signaling etc. defined similarly to DVB-T2, but with the addition of some important changes to accommodate new conditions and transmission systems not envisioned by the DVB-T2 standard body.

In another aspect of the present principles, the components of Table 1 (including broadcaster table and special messages) or a subset of these components may be incorporated as parameters of the signaling data 342 and special messages 344. At the receiver, as described in FIG. 4, these parameters 426 are retrieved accordingly and used to identify a broadcasters's content/service, DVB-SI or equivalent information (e.g., PSIP) and special messages. For example, for a DVB-T2 type of system, the parameters can be placed in the L1-post signaling data. An exemplary change adds a super_group id (or broadcaster id) for each PLP, in addition to a group id. This gives an additional level of hierarchy to distinguish between multiple broadcasters using the same physical channel. All group id's belonging to the same broadcaster would have the same super group id. This reduces complexity as the receiver can easily separate multiple broadcaster's streams and find and decode the appropriate PSIP/DVB-SI information for each broadcaster. In addition, the super_group_id allows the modulator to monitor and control the capacity usage of each broadcaster at a high level without the need for the modulator to decode and understand the DVB-SI or PSIP information. Furthermore, the super_group_id can also be used to identify specific services or groups of services that do not naturally have PSIP/DVB-SI information. The parameter is described as follows:

SUPER_GROUP_ID: This 8-bit field identifies with which super group within the system the current PLP is associated. This can be used by a receiver to link all of the PLPs associated with a common broadcaster which will have the same SUPER_GROUP_ID.

At the receiver, once the super_group_id parameter (426 in FIG. 4) is recovered, it is then sent to other blocks, including the audio/video/ancillary (non-signaling) data demodulator 414 and the audio/video/ancillary data channel decoder/detector 324. These two blocks will demodulate and decode the audio, video and other ancillary (data other than signaling) data symbols for the particular broadcaster and appropriately recover the content and DVB-SI or equivalent information (e.g., PSIP).

Figure 5:
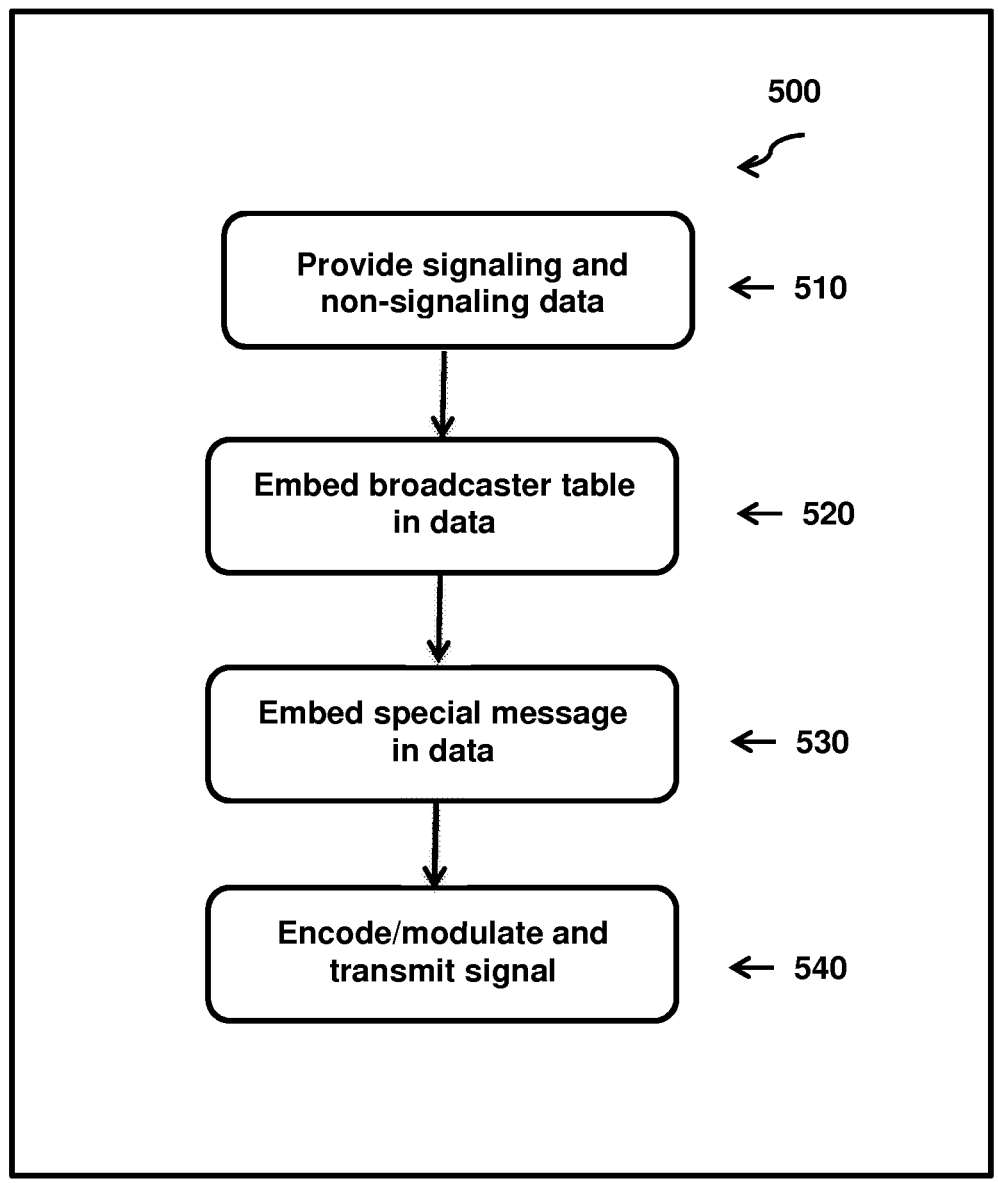
FIG. 5 illustrates a flowchart of a method for transmitting a signal according to the present principles.

FIG. 5 shows a flowchart 500 of a method for transmitting a signal according to the present principles. Initially, signaling and non-signaling data is is provided or received 510 at a data source as in 300 of FIG. 3, including a broadcaster table 520 and special messages 530, which are incorporated in the data, either as a System PLP or as signaling data. Finally, the data is encoded and/or modulated and the signal is transmitted 540.

Figure 6:
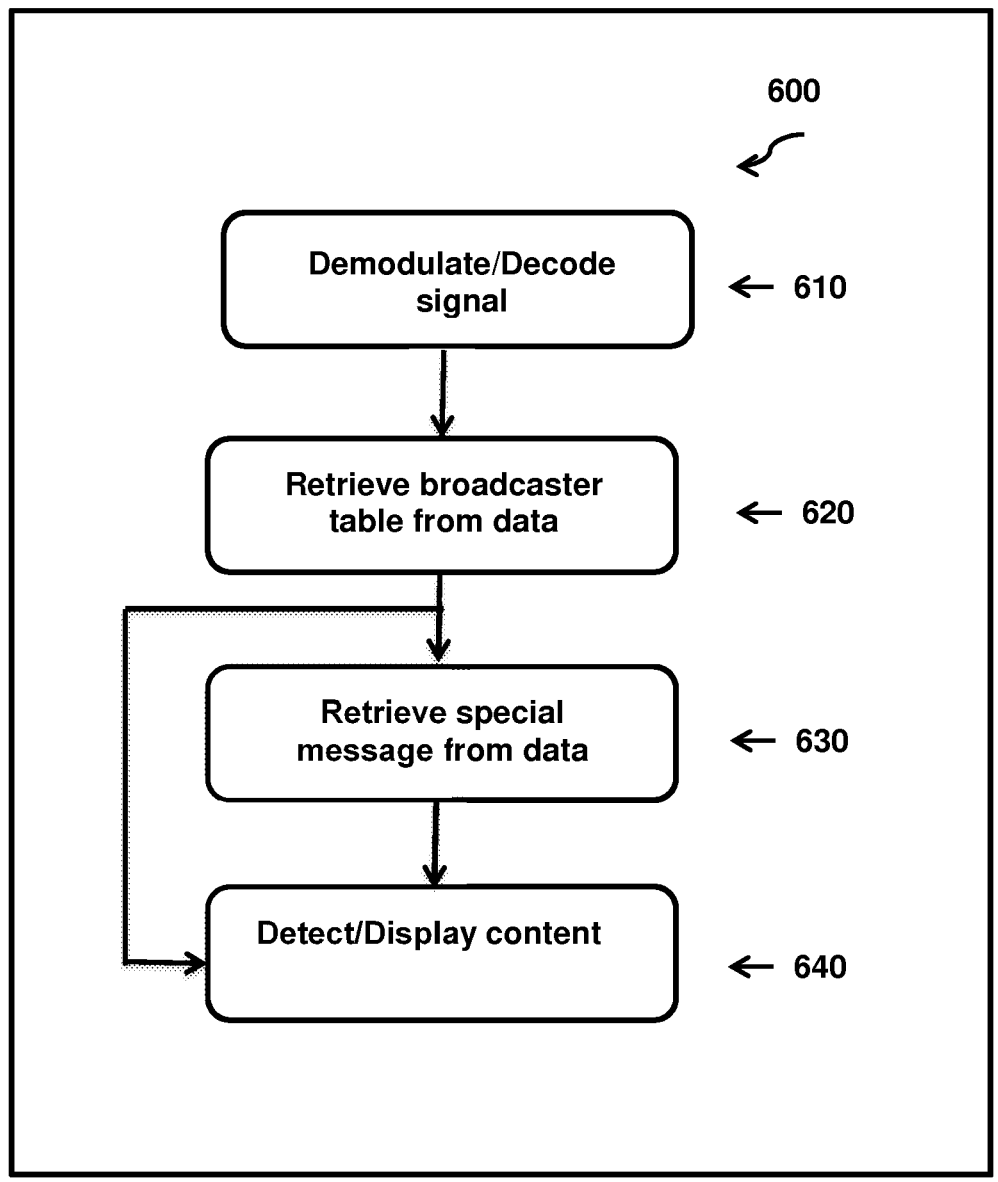
FIG. 6 illustrates a flowchart of a method for receiving a signal according to the present principles.

FIG. 6 shows a flowchart 600 of a method for receiving a signal according to the present principles. Initially, the receiver demodulates the signal 610 and recovers the broadcaster table 620 and/or special message 630 from either the System PLP or the signaling data. The broadcaster table is used to identify the broadcaster PLPs and retrieve the SI information. Finally the content data recovered and delivered to a display device 640.

In view of the above, the foregoing merely illustrates the present principles, and it will thus be appreciated that those skilled in the art will be able to devise numerous alternative arrangements which, although not explicitly described herein, embody the present principles and are within its spirit and scope. For example, although illustrated in the context of separate functional elements, the various functional elements of a transmitter and/or receiver may be embodied in one, or more, integrated circuits (ICs). Similarly, although shown as separate elements, any or all of the elements may be implemented in a stored-program-controlled processor, e.g., a digital signal processor, which executes associated software, e.g., corresponding to one, or more, of steps. In addition, the present principles may apply to other multi-carrier modulation systems besides OFDM, e.g., discrete multi-tone (DMT) and to other types of single-carrier or multi-carrier pre-existing or legacy systems besides 8-VSB, e.g., single carrier QAM modulation. Further, the present principles are applicable to other types of communications systems, e.g., Wireless-Fidelity (Wi-Fi), cellular, cable, satellite, etc. Indeed, the inventive concept is also applicable to stationary or mobile receivers. It is therefore to be understood that numerous modifications may be made to the illustrative embodiments and that other arrangements may be devised without departing from the spirit and scope of the present principles.

The invention claimed is:

1. An apparatus for transmitting a multi-carrier modulated signal on a physical channel, said apparatus comprising:
a source that provides data, said data comprising a broadcaster table identifying a plurality of broadcasters which are sharing said physical channel and providing a PLP id for each of a plurality of physical layer pipes (PLP) belonging to said plurality of broadcasters, wherein each physical layer pipe of the plurality of physical layer pipes represents a virtual channel or service and at least one PLP of the plurality of physical layer pipes is shared among at least two broadcasters in the plurality of broadcasters; and a multi-carrier modulator that modulates said data by allocating said data to a plurality of carriers of said physical channel in a plurality of modulation symbols;

wherein the broadcaster table comprises a broadcaster id for each broadcaster of said plurality of broadcasters and a corresponding broadcaster system information PLP id, and a broadcaster system information PLP containing system information for each broadcaster; and wherein the broadcaster table further comprises a number of PLPs for each broadcaster and each PLP id for each broadcaster.

2. The apparatus according to claim 1, wherein the broadcaster table comprises at least one broadcaster id for each PLP in said physical channel.

3. The apparatus according to claim 1, wherein the broadcaster table is placed in a separate PLP, called system PLP.

4. The apparatus according to claim 3, wherein the System PLP further comprises special messages and a special message indicator.

5. The apparatus according to claim 1 wherein said data further comprises signaling data and the broadcaster table is placed in the signaling data.

6. The apparatus according to claim 1 further comprising:
a channel encoder for at least channel encoding said data prior to the multi-carrier modulator.

7. The apparatus according to claim 1 wherein the multi-carrier modulation is OFDM.

8. An apparatus for receiving a multi-carrier modulated signal on a physical channel, said apparatus comprising:
a multi-carrier demodulator that demodulates said signal to create demodulated symbols; and
a data detector that retrieves a broadcaster table from said demodulated symbols, said broadcaster table identifying a plurality of broadcasters which are sharing said physical channel and for retrieving data, said data comprising a PLP id for each of a plurality of physical layer pipes (PLP) belonging to said plurality of broadcasters, wherein each physical layer pipe of the plurality of physical layer pipes represents a virtual channel or service and at least one PLP of the plurality of physical layer pipes is shared among at least two broadcasters in the plurality of broadcasters;
wherein the broadcaster table comprises a broadcaster id for each broadcaster of said plurality of broadcasters and a corresponding broadcaster system information PLP id, and a broadcaster system information PLP containing system information for each broadcaster; and
wherein the broadcaster table further comprises a number of PLPs for each broadcaster and each PLP id for each broadcaster.

9. The apparatus according to claim 8, wherein the broadcaster table comprises at least one broadcaster id for each PLP in said physical channel.

10. The apparatus according to claim 8, wherein the data detector retrieves the broadcaster table from a separate PLP, called system PLP.

11. The apparatus according to claim 10, wherein the data detector further retrieves a special message indicator and special message from said System PLP.

12. The apparatus according to claim 8 wherein said data further comprises signaling data and the data detector retrieves the broadcaster table from the signaling data.

13. The apparatus according to claim 8 further comprising:
a channel decoder for at least channel decoding the output of the multi-carrier demodulator prior to recovering said broadcaster table.

14. The apparatus according to claim 8 wherein the multi-carrier modulation is OFDM.

15. A method for transmitting a multi-carrier modulated signal on a physical channel, said method comprising:
providing data, said data comprising
a broadcaster table identifying a plurality of broadcasters which are sharing said physical channel and
providing a PLP id for each of a plurality of physical layer pipes (PLP) belonging to said plurality of broadcasters, wherein each physical layer pipe of the plurality of physical layer pipes represents a virtual channel or service and at least one PLP of the plurality of physical layer pipes is shared among at least two broadcasters in the plurality of broadcasters; and multi-carrier modulating said data by allocating said data to a plurality of carriers of said physical channel in a plurality of modulation symbols;
wherein the broadcaster table comprises a broadcaster id for each broadcaster in the plurality of broadcasters and a corresponding broadcaster system information PLP id, and a broadcaster system information PLP containing system information for each broadcaster, and
wherein the broadcaster table further comprises a number of PLPs for each broadcaster and each PLP id for each broadcaster.

16. The method according to claim 15, wherein the broadcaster table comprises at least one broadcaster id for each PLP in said physical channel.

17. The method according to claim 15, wherein the broadcaster table is placed in a separate PLP, called system PLP.

18. The method according to claim 17, wherein the System PLP further comprises special messages and a special message indicator.

19. The method according to claim 15 wherein said data further comprises signaling data and the broadcaster table is placed in the signaling data.

20. The method according to claim 15 further comprising:
channel encoding said data prior to the multi-carrier modulator.

21. The method according to claim 15 wherein the multi-carrier modulation is OFDM.

22. A method for receiving a multi-carrier modulated signal on a physical channel, said method comprising:
multi-carrier demodulating said signal to create demodulated symbols; and
retrieving a broadcaster table from said demodulated symbols, said broadcaster table identifying a plurality of broadcasters which are sharing said physical channel and for retrieving data, said data comprising a PLP id for each of a plurality of physical layer pipes (PLP) belonging to said plurality of broadcasters, wherein each physical layer pipe of the plurality of physical layer pipes represents a virtual channel or service and at least one PLP of the plurality of physical layer pipes is shared among at least two broadcasters in the plurality of broadcasters;

wherein the broadcaster table comprises a broadcaster id for each broadcaster in the plurality of broadcasters and a corresponding broadcaster system information PLP id and a broadcaster system information PLP containing system information for each broadcaster; and wherein the broadcaster table further comprises a number of PLPs for each broadcaster and each PLP id for each broadcaster.

23. The method according to claim 22, wherein the broadcaster table comprises at least one broadcaster id for each PLP in said physical channel.

24. The method according to claim 22, wherein the broadcaster table is retrieved from a separate PLP, called system PLP.

25. The method according to claim 24, wherein the System PLP further comprises special messages and a special message indicator.

26. The method according to claim 22 wherein said data further comprises signaling data and the broadcaster table is retrieved from the signaling data.

27. The method according to claim 22 further comprising:
a channel decoder for at least channel decoding the output of the multi-carrier demodulator prior to recovering said broadcaster table.

28. The method according to claim 22 wherein the multi-carrier modulation is OFDM.

\* \* \* \* \*